Aug. 22, 1961 J. L. JENSEN 2,997,664

SATURABLE CORE TRANSISTOR OSCILLATOR

Filed Nov. 30, 1956

INVENTOR.
JAMES L. JENSEN

BY Omund R. Dahle

ATTORNEY

United States Patent Office 2,997,664
Patented Aug. 22, 1961

2,997,664

SATURABLE CORE TRANSISTOR OSCILLATOR

James Lee Jensen, St. Louis Park, Minn., assignor to Minneapolis-Honeywell Regulator Company, Minneapolis, Minn., a corporation of Delaware Filed Nov. 30, 1956, Ser. No. 625,376
2 Claims. (Cl. 331—109)

This invention relates generally to electrical power supplies, and is more particularly related to electronic circuitry utilizing semiconductor amplifying devices for converting a relatively low D.C. voltage to a relatively high A.C. voltage.

In my copending application entitled "Oscillator," Serial No. 530,981, filed August 29, 1955, now U.S. Patent No. 2,774,878, and assigned to the same assignee as the present invention, I have disclosed a semi-conductor circuit for converting relatively low D.C. potentials to relatively high A.C. potentials, comprising a transistor oscillator having a saturable core transformer in the feedback loop, wherein the saturation of the saturable core initiates the switching action of the circuit. It has been noted that in the operation of the circuit of my copending application, that the frequency of oscillation and therefore the frequency of output potential is subject to variation due to several causes including variations in the magnitude of the D.C. potential source and also due to changes in the load supplied to the device. In my present invention, which is an improvement over my copending application, I have provided a circuit arrangement in which the output frequency of the power supply is maintained relatively stable in spite of variations of supply potential or variations in load applied to the power supply.

It is therefore an object of this invention to provide a semiconductor power supply for converting a relatively low D.C. potential to a relatively high A.C. potential, in which the frequency of the power supply is maintained stable and is independent of the load applied or the variations in the magnitude of the D.C. potential source.

It is a further object of my invention to provide a semiconductor power supply for converting a relatively low D.C. potential to a relatively high A.C. potential, comprising a semiconductor oscillator having circuit means for stabilizing the operating frequency to make the output frequency independent of the load applied to the device.

Figure 1:
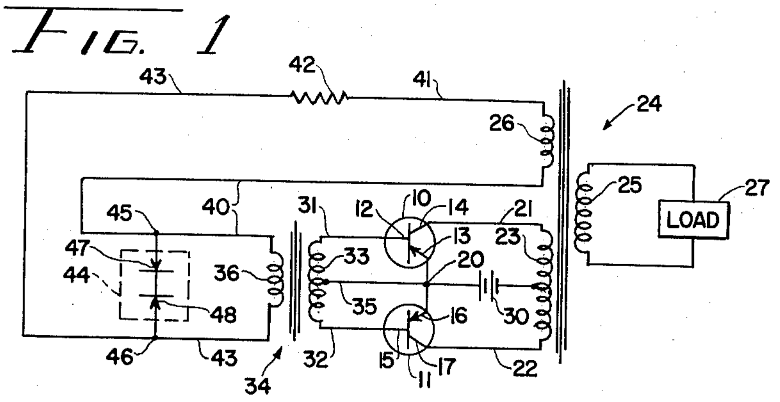
Figure 2:
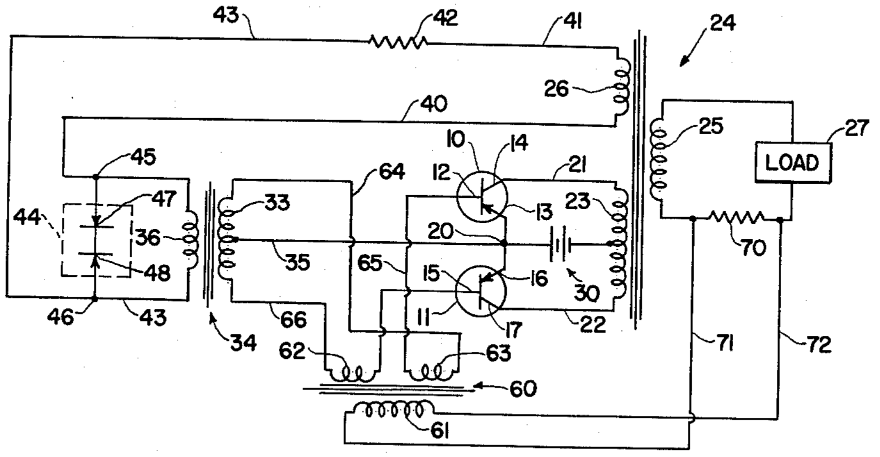
Figure 1A:
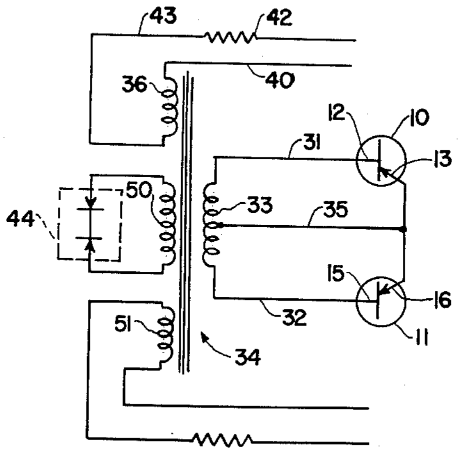

These and other objects of the present invention will be understood upon consideration of the accompanying specification, claims, and drawings of which:

FIGURE 1 is a schematic diagram of an embodiment of the invention,

FIGURE 1*a* is a schematic diagram showing a variation in the circuit of FIGURE 1, and FIGURE 2 is another schematic representation of an embodiment of the invention.

Referring now to FIGURE 1 there is disclosed a pair of semiconductor amplifying devices 10 and 11, shown as junction transistors, transistor 10 having a base electrode 12, an emitter electrode 13, and a collector electrode 14. Transistor 11 has a base electrode 15, an emitter electrode 16, and a collector electrode 17. The emitter electrodes 13 and 16 are directly connected together at a junction 20. The collector electrodes 14 and 17 are connected by conductors 21 and 22, respectively, to opposite ends of a center tapped primary winding 23 of a transformer 24. The transformer 24 also has a pair of secondary windings 25 and 26. The terminals of secondary windings 25 are connected to energize a suitable load device 27. A source of direct current potential 30, here shown as a battery, is connected intermediate the center tap connection of the transformer winding 23 and the junction 20. The base electrodes 12 and 15 are connected by conductors 31 and 32, respectively, to the opposite terminals of a center tapped secondary winding 33 of an easily saturable transformer 34. The center tap connection of the winding 33 is connected by a conductor 35 to the junction 20. The transformer 34 also includes a primary winding 36. A conductor 40 connects a first terminal of the winding 26 of transformer 24 to a first terminal of the winding 36 of transformer 34. The opposite terminal of winding 26 is connected by a conductor 41, an impedance 42, here shown as a resistive element for simplicity, and a conductor 43 to the opposite terminal of the winding 36. A voltage clipper 44 is connected between the conductor 40, at a junction 45, and the conductor 43, at a junction 46. A clipper 44 may be any suitable electronic clipper circuit, but as here shown comprises a pair of Zener diodes 47 and 48 connected in series in opposing relation to each other.

*Operation of FIGURE 1*

In my copending application entitled "Oscillator," Se-1, let us assume that the potential source 30 has just been applied to the circuit. Let us further assume that the operating characteristics of the transistors are such that the leakage current flowing in the collector 14 is greater than that flowing in the collector 17. A voltage will then appear across the primary winding 23, thereby tending to induce voltage in the secondary windings 25 and 26. The potential induced on winding 26 is applied to the voltage feedback transformer 34 in such a polarity that the base electrode 12 is made slightly negative with respect to emitter 13 and the base 15 is made slightly positive with respect to emitter 16. This bias applied to transistor 10 is in a direction to increase the current flow in the collector circuit of transistor 10. The increased current flow from transistor 10 results in a larger voltage on the winding 23, thereby causing a larger feedback voltage to appear on winding 26 which is regeneratively coupled through transformer 34 to the input electrodes of the transistor. The action leading to the full conduction of transistor 10 and the cutoff of transistor 11, while described as cumulative, happens almost instantaneously upon connecting the direct current source to the circuit; the time required being relatively short compared to a half cycle of operation. A current path may be traced from the positive terminal of source 30 to the junction 20, through transistor 10 from the emitter to the collector, conductor 21, and through the upper portion of winding 23 and the center tapped terminal back to the negative terminal of the source.

The current flowing in transistor 10 and in the feedback circuit will continue until such time as the transformer 34 reaches saturation of the core. At this point the shunt impedance of the transformer 34 decreases which would tend to cause an increase in feedback current from winding 26. This increase in feedback current passing through current limiting impedance 42 causes an additional voltage drop across impedance 42 and therefore the voltage across winding 36 decreases. Upon this condition of operation being reached the potential induced in winding 33 is decreased thereby tending to reduce the conductivity of the transistor 10, and thus reduce the current flowing through winding 23 of output transformer 24. The flux change of transformer 24 is such as to cause a voltage of the opposite polarity to be produced in its windings. This voltage is fed back through transformer 34 and causes transistor 10 to be cut off and transistor 11 to become conductive. The second half of the cycle now continues until the core of the transformer 34 saturates in the reverse direction completing the second half cycle, whereupon the initial state again resumes and the cycle repeats. It is preferred that transformer 34 saturate considerably before the condition of saturation is approached in transformer 24, as in this manner large core losses and high transients which would otherwise occur due to saturation of transformer 24 are avoided. The core losses in the feedback transformer 34 are relatively insignificant when compared to the circuit as a whole. It will be appreciated that a saturating autotransformer or a saturable coil may be used in place of the transformer 34 if desirable.

The clipper circuit 44 is connected across the exterior terminal of the primary winding 36 of feedback transformer 34 in order to provide a constant feedback voltage to the transformer 34 under all conditions of operation. Since the time required to saturate the core of transformer 34 is a function of the voltage applied across the primary winding 36 and the current flowing therethrough, the clipper 44 is effective to keep the frequency of the oscillator relatively constant by maintaining the voltage applied to the transformer constant. In the absence of a clipper circuit, such as is shown in FIGURE 1, the frequency of operation of the oscillator can be varied substantially by variations in the supply potential 30 or by variations in the load 27. In the design of the circuit of FIGURE 1 the feedback potential from winding 26 is made sufficiently high so that under all conditions of operation voltage clipping will occur. In effect then the portion of the feedback signal which exceeds the predetermined clipping level is shunted out and does not reach the saturable transformer. Since it is the portion which exceeds the clipping level which is subject to variation when the load or source is changed, by introducing the clipping circuit 44 the time required to produce saturation in the core of transformer 34 is maintained relatively constant thereby producing a constant output frequency from the apparatus.

In devices using the saturation of core materials to achieve timing or determine frequency, as in the oscillator power supply of FIGURE 1, the induced voltage fed back which depends upon the source potential and upon the applied load has an effect on the time to reach saturation. In FIGURE 1 frequency stability is obtained by clipping or limiting the voltage applied to the saturating transformer 34. In some circuits, however, such as poly phase oscillators, for example, more than one feedback voltage may be present and the clipping tends to become rather complex. In FIGURE 1*a* there is shown a modification of the circuit of FIGURE 1, in which it is desired to accommodate more than one feedback circuit and still maintain frequency stability by means of a simple clipper circuit.

In FIGURE 1*a* which is a partial schematic, similar in most respects to FIGURE 1, it will be noted that the identifying numerals in FIGURE 1*a* correspond with the numerals used in FIGURE 1. The saturating transformer 34 of FIGURE 1*a* has in addition to the windings 36 and 33, a low impedance winding 50 and a further feedback winding 51. It will be noted that the clipper 44, which may be the same as described in FIGURE 1 is connected intermediate the terminals of the low impedance winding 50. When the voltage induced in the winding 50 resulting from the summation of the magnetic potentials in the feedback windings, reaches the operating value of the limiter, the winding then acts substantially as a short circuited winding thus tending to demagnetize the core so that the effective impedances of the feedback primary windings are at once lowered. Since each of the feedback windings have the current limiting resistor in series therewith, the voltage across the windings is diminished as previously explained. As a result of this action, proper summing of signals may be obtained while still maintaining frequency stability of a device.

Referring now to FIGURE 2, there is disclosed a circuit which has in addition to the clipper circuit in the voltage feedback transformer circuit, the feedback which is proportional to the load current of the apparatus. For the components which are identical with FIGURE 1 the same identifying numerals are used, therefore, only the components not included in FIGURE 1 will be mentioned hereinafter. A current feedback transformer 60 is disclosed which has a primary winding 61 and a pair of secondary windings 62 and 63. The right hand terminal of secondary winding 63 is connected by a conductor 64 to the upper terminal of winding 33 of saturating transformer 34. The other terminal of winding 63 is connected by a conductor 65 to the base electrode 12. The left hand terminal of secondary winding 62 is connected by the conductor 66 to the lower terminal of the winding 33, and the other terminal of winding 62 is connected by conductor 67 to the base electrode 15 of transistor 11. An impedance 70, shown as a resistive element, is connected in series with the load device 27. A pair of conductors 71 and 72 connect the opposite terminals of the resistor 70 respectively to opposite terminals of the winding 61 of transformer 60.

In considering the operation of the circuit of FIGURE 2 it will be noted that there is a relatively fixed feedback through the saturating transformer 34 which is summed with further feedback which is a function of the output current. The fixed feedback circuit, as preferably designed is predominant and therefore is effective to stabilize the frequency of the apparatus as is described in the operation of FIGURE 1. The circuit of FIGURE 2 is designed, as in FIGURE 1, so that the saturation of the transformer 34 initiates the switching action to cause the circuit to oscillate. The clipper 44 serves the same function as described in FIGURE 1 to maintain the voltage supplied to the primary winding 36 of the transformer 34 relatively constant whereby the output of the apparatus is frequency stable under all operating conditions. Under certain conditions it is desirable to increase the feedback to the transistors as a function of the load current, and it will be noted that in FIGURE 2 a voltage is developed across the resistor 70 which is proportional to the load current in load device 27. The voltage developed across resistor 70 is applied to the primary winding 61 of the current transformer 60, and the potentials induced in the secondary windings 62 and 63 are summed with the feedback voltage from the secondary winding 33 of the transformer 34. The transformer windings 63 and 62 are connected in such a phase relation that increased load current induces in the secondary windings potentials of the proper polarity to increase the current conduction of the transistor then conducting. For example, when transistor 10 is conductive the potential induced in secondary winding 63 has an instantaneous polarity such that the left hand terminal of the winding is negative with respect to the right hand terminal. This potential is summed with the feedback potential from secondary winding 33 of transformer 34, and thereby tends to drive the transistor 10 toward its maximum conductivity. The secondary winding 62 of transformer 60 is effective on the succeeding half cycle to aid in controlling the conductivity of transistor 11 as a function of the load current.

The circuit is so designed that in operation only the feedback transformer 34 reaches a state of saturation of the core, and thereby the frequency stability is maintained even though increased drive is provided from the current feedback circuit as a function of the load current.

Many changes and modifications of this invention will undoubtedly occur to those who are skilled in the art and I therefore wish it to be understood that I intend to be limited by the scope of the appended claims and not by the specific embodiment of my invention which is disclosed herein for the purpose of illustration only.

I claim:

1. Power supply apparatus comprising: semiconductor amplifying means having input and output terminals; first transformer means having a plurality of windings including a primary winding and first and second secondary windings; a source of unidirectional potential; means including said primary winding connecting said source intermediate said semiconductor output terminals; load means; circuit means connecting said first secondary winding to said load means; saturable transformer means; first feedback means including said saturable transformer means connected intermediate said second secondary winding and said input terminals; said first feedback means being connected to initially tend to increase the flow of current through the output terminals, said saturable transformer means having a saturable core for limiting the amount of signal transmitted to said input terminals so that upon such limiting value being reached, the saturable transformer means is effective to decrease the signal transmitted to said input terminals whereby said amplifying means is alternately made conductive and nonconductive, voltage limiting means connected to said saturable transformer means in said first feedback means to limit the rate of change of flux in said saturable core to a constant value; and second feeback means connected intermediate said circuit means and said input terminals for supplying a feedback potential to said semiconductor amplifying means proportional to the output power supplied to said load device.

2. Power supply apparatus for converting a direct current potential to an alternating current potential of relatively constant frequency, comprising: semiconductor amplifying means having a plurality of terminals including input and output terminals; means connecting said output terminals to a source of unidirectional potential; output means connecting said output terminals to load means; saturable impedance means; first feedback means connected from said output means to said saturable impedance means; circuit means connecting said saturable impedance means to said input terminals of said semiconductor means; voltage limiting means connected to said saturable impedance means to limit the rate of change of flux in said saturable impedance means to a constant value; and second feedback means providing a feedback proportional to the power supplied to said load device connected intermediate said load means and said input terminals.

References Cited in the file of this patent

UNITED STATES PATENTS

| | | |
|---|---|---|
| 2,379,694 | Edson | July 3, 1945 |
| 2,453,958 | Andresen | Nov. 16, 1948 |
| 2,704,330 | Marker | Mar. 15, 1955 |
| 2,728,049 | Riddle | Dec. 20, 1955 |
| 2,774,878 | Jensen | Dec. 18, 1956 |
| 2,783,384 | Bright et al. | Feb. 26, 1957 |
| 2,794,124 | Purington | May 28, 1957 |
| 2,854,651 | Kircher | Sept. 30, 1958 |